US005838943A

United States Patent [19]
Ramagopal et al.

[11] Patent Number: 5,838,943
[45] Date of Patent: *Nov. 17, 1998

[54] APPARATUS FOR SPECULATIVELY STORING AND RESTORING DATA TO A CACHE MEMORY

[75] Inventors: Hebbalalu Suryaprakash Ramagopal; Rajiv M. Hattangadi, both of Austin, Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 621,958

[22] Filed: Mar. 26, 1996

[51] Int. Cl.$^6$ ....................................................... G06F 9/38
[52] U.S. Cl. ............................................. 395/394; 395/569
[58] Field of Search .................................... 395/394, 569, 395/586, 581, 591

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 395/402 |
| 4,794,521 | 12/1988 | Ziegler et al. | 711/130 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

IBM Technical Disclosure Bulletin entitled, "Fast Cache Access Based on Most Recently Used Hits," vol. 30, No. 10, Mar. 1988, pp. 1–4.

International Search Report for PCT/US 96/17517 dated May 6, 1997.

Intel, "Chapter 2: Microprocessor Architecture Overview," pp. 2–1 through 2–4.

Michael Slater, "AMD'S K5 Designed to Outrun Pentium," Microprocessor Report, vol. 8, No. 14, Oct. 24, 1994, 7 pages.

Sebastian Rupley and John Clyman, "P6: The Next Step?," PC Magazine Sep. 12, 1995, 16 pages.

Tom R. Halfhill, "AMD K6 Takes On Intel P6," BYTE, Jan. 1996, 4 pages.

*Primary Examiner*—Parshotam S. Lall
*Assistant Examiner*—Viet Vu
*Attorney, Agent, or Firm*—Conely, Rose & Tayon; B. Noel Kivlin; Lawrence J. Merkel

[57] ABSTRACT

An apparatus for performing speculative stores is provided. The apparatus reads the original data from a cache line being updated by a speculative store, storing the original data in a restore buffer. The speculative store data is then stored into the affected cache line. Should the speculative store later be canceled, the original data may be read from the restore buffer and stored into the affected cache line. The cache line is thereby returned to a pre-store state. In one embodiment, the cache is configured into banks. The data read and restored comprises the data from one of the banks which comprise the affected cache line. Instead of forwarding store data to subsequent load memory accesses, the store is speculatively performed to the data cache and the loads may subsequently access the data cache. Dependency checking between loads and stores prior to the speculative performance of the store may stall the load memory access until the corresponding store memory access has been performed. Similar functionality to forwarding of store data is obtained through the performance of load memory accesses to the data cache. Additionally, speculative load memory accesses which are partially overlapped by a prior speculative store memory access may be performed more efficiently.

40 Claims, 8 Drawing Sheets

U.S. PATENT DOCUMENTS

| | | | |
|---|---|---|---|
| 4,807,115 | 2/1989 | Torng | 395/391 |
| 4,858,105 | 8/1989 | Kuriyama et al. | 395/582 |
| 4,901,233 | 2/1990 | Liptay | 395/394 |
| 4,905,141 | 2/1990 | Brenza | 711/129 |
| 4,912,626 | 3/1990 | Fiacconi | 711/124 |
| 5,091,851 | 2/1992 | Shelton et al. | 711/128 |
| 5,148,538 | 9/1992 | Celtruda et al. | 711/205 |
| 5,210,845 | 5/1993 | Crawford et al. | 711/128 |
| 5,226,126 | 7/1993 | McFarland et al. | 395/394 |
| 5,226,130 | 7/1993 | Favor et al. | 395/585 |
| 5,228,134 | 7/1993 | MacWilliams et al. | 711/138 |
| 5,235,697 | 8/1993 | Steely, Jr. et al. | 711/137 |
| 5,269,017 | 12/1993 | Hayden et al. | 395/182.13 |
| 5,418,922 | 5/1995 | Liu | 711/3 |
| 5,471,598 | 11/1995 | Quattromani et al. | 395/449 |
| 5,495,590 | 2/1996 | Comfort et al. | 395/569 |
| 5,509,119 | 4/1996 | La Fetra | 395/185.05 |
| 5,530,958 | 6/1996 | Agarwal et al. | 711/3 |
| 5,564,034 | 10/1996 | Miyake | 711/128 |
| 5,584,009 | 12/1996 | Garibay, Jr. et al. | 711/117 |
| 5,590,352 | 12/1996 | Zuraski, Jr. et al. | 395/800.23 |
| 5,596,740 | 1/1997 | Quattromani et al. | 711/157 |
| 5,603,047 | 2/1997 | Caulk, Jr. | 395/800.23 |

APPARATUS FOR SPECULATIVELY STORING AND RESTORING DATA TO A CACHE MEMORY

BACKGROUND OF THE INVENTION

1. Field of the Invention

This invention relates to microprocessors and, more particularly, to an apparatus for performing store memory accesses in a microprocessor.

2. Description of the Relevant Art

Superscalar microprocessors achieve high performance by simultaneously executing multiple instructions during a clock cycle and by specifying the shortest possible clock cycle consistent with the design. As used herein, the term "clock cycle" refers to an interval of time during which the pipeline stages of a microprocessor perform their intended functions. Storage devices (e.g. registers or arrays) capture their values in response to a clock signal defining the clock cycle. For example, storage devices may capture a value in response to a rising or falling edge of the clock signal.

Since superscalar microprocessors execute multiple instructions per clock cycle and the clock cycle is short, a high bandwidth memory system is required to provide instructions and data to the superscalar microprocessor (i.e. a memory system that can provide a large number of bytes in a short period of time). However, superscalar microprocessors are ordinarily configured into computer systems with a large main memory composed of dynamic random access memory (DRAM) cells. DRAM cells are characterized by access times which are significantly longer than the clock cycle of modern superscalar microprocessors. Also, DRAM cells typically provide a relatively narrow output bus to convey the stored bytes to the superscalar microprocessor. Therefore, DRAM cells provide a memory system that provides a relatively small number of bytes in a relatively long period of time, and do not form a high bandwidth memory system.

Because superscalar microprocessors are typically not configured into a computer system with a memory system having sufficient bandwidth to continuously provide instructions and data, superscalar microprocessors are often configured with caches. Caches are storage devices containing multiple blocks of storage locations, configured on the same silicon substrate as the microprocessor or coupled nearby. The blocks of storage locations are used to hold previously fetched instruction or data bytes. Each block of storage locations stores a set of contiguous bytes, and is referred to as a cache line. Typically, cache lines are transferred to and from the main memory as a unit. Bytes can be transferred from the cache to the destination (a register or an instruction processing pipeline) quickly; commonly one or two clock cycles are required as opposed to a large number of clock cycles to transfer bytes from a DRAM main memory.

Caches may be organized into an "associative" structure (also referred to as "set associative"). In a set associative structure, the cache lines are accessed as a two-dimensional array having rows and columns. When a cache is searched for bytes residing at an address, a number of bits from the address are used as an "index" into the cache. The index selects a particular row within the two-dimensional array, and therefore the number of address bits required for the index is determined by the number of rows configured into the cache. The act of selecting a row via an index is referred to as "indexing". The addresses associated with bytes stored in the multiple cache lines of a row are examined to determine if any of the addresses match the requested address. If a match is found, the access is said to be a "hit", and the cache provides the associated bytes. If a match is not found, the access is said to be a "miss". When a miss is detected, the bytes are transferred from the memory system into the cache. The addresses associated with bytes stored in the cache are also stored. These stored addresses are referred to as "tags" or "tag addresses".

The cache lines within a row form the columns of the row. Columns may also be referred to as "ways". The column is selected by examining the tags from a row and finding a match between one of the tags and the requested address. A cache designed with one column per row is referred to as a "direct-mapped cache". In a direct-mapped cache, the tag must be examined to determine if an access is a hit, but the tag examination is not required to select which bytes are transferred to the outputs of the cache.

In addition to employing caches, superscalar microprocessors often employ speculative execution to enhance performance. An instruction may be speculatively executed if the instruction is executed prior to determination that the instruction is actually to be executed within the current instruction stream. Other instructions which precede the instruction in program order may cause the instruction not to be actually executed (i.e. a mispredicted branch instruction or an instruction which causes an exception). If an instruction is speculatively executed and later determined to not be within the current instruction stream, the results of executing the instruction are discarded. Unfortunately, store memory accesses are typically not performed speculatively. As used herein, a "memory access" refers to a transfer of data between one or more main memory storage locations and the microprocessor. A transfer from memory to the microprocessor (a "read") is performed in response to a load memory access. A transfer from the microprocessor to memory (a "write") is performed in response to a store memory access. Memory accesses may be a portion of executing an instruction, or may be the entire instruction. A memory access may be completed internal to the microprocessor if the memory access hits in the data cache therein. As used herein, "program order" refers to the sequential order of instructions specified by a computer program.

While speculative load memory accesses are often performed, several difficulties typically prevent implementation of speculative store memory accesses. As opposed to registers which are private to the microprocessor, memory may be shared with other microprocessors or devices. Although the locations being updated may be stored in the data cache, the data cache is required to maintain coherency with main memory. In other words, an update performed to the data cache is recognized by other devices which subsequently access the updated memory location. Other devices must not detect the speculative store memory access, which may later be canceled from the instruction processing pipeline due to incorrect speculative execution. However, once the store becomes non-speculative, external devices must detect the corresponding update. Additionally, speculative loads subsequent to the speculative store within the microprocessor must detect the updated value even while the store is speculative.

Instead of speculatively performing store memory accesses, many superscalar microprocessors place the store memory accesses in a buffer. When the store memory accesses become non-speculative, they are performed. Load memory accesses which access memory locations updated by a prior store memory access may be stalled until the store memory access completes, or may receive forwarded data from the store memory access within the buffer. Even when forwarding is implemented, the load memory access is stalled for cases in which the load memory access is not completely overlapped by the store memory access (i.e. the load memory access also reads bytes which are not updated by the store memory access). Buffer locations occupied by stores and loads which depend upon those stores are not available to subsequent memory accesses until the store is performed. Performance of the microprocessor is thereby decreased due to the inability to perform speculative store memory accesses. An apparatus allowing speculative performance of store memory accesses while ensuring correct operation is desired.

SUMMARY OF THE INVENTION

The problems outlined above are in large part solved by an apparatus for performing speculative stores. The apparatus reads the original data from a cache line being updated by a speculative store, storing the original data in a restore buffer. The speculative store data is then stored into the affected cache line. Should the speculative store later be canceled, the original data may be read from the restore buffer and stored into the affected cache line. The cache line is thereby returned to a pre-store state. In one embodiment, the cache is configured into banks. The data read and restored comprises the data from one of the banks which comprise the affected cache line. Advantageously, store memory accesses are performed speculatively. Since the store memory access has already been performed, the store memory access may immediately be discarded by the load/store unit when the corresponding instruction is retired. Performance may be increased by more efficient release of load/store buffer space. Additionally, the reorder buffer may retire subsequent instructions more quickly. Reorder buffer efficiency may thereby be increased. Still further, store throughput may be increased due to the speculative performance of the cache access. Cache access and hit determination need not be performed between receipt of a retirement indication from the reorder buffer and a signal from the load/store unit that the store memory access is completed. Subsequent stores may then be indicated as ready to retire earlier. The ability to restore the original data to the cache line enables correct operation in the case of incorrect execution of the speculative store or a snoop hit.

As opposed to many prior load/store units, the load/store unit described herein does not perform forwarding of store data to subsequent load memory accesses. Instead, since the store is speculatively performed to the data cache, the loads may access the data cache. Dependency checking between loads and stores prior to the speculative performance of the store may stall the load memory access until the corresponding store memory access has been performed. Advantageously, forwarding logic is not employed by the load/store unit. Similar functionality is obtained through the performance of load memory accesses to the data cache. Additionally, speculative load memory accesses which are partially overlapped by a prior speculative store memory access may be performed more efficiently. The data cache, subsequent to the speculative store, contains each of the bytes accessed by the load memory access.

Broadly speaking, the present invention contemplates an apparatus for performing speculative stores in a microprocessor comprising a first buffer, a first control unit, a cache and a second buffer. The first buffer is configured to store a plurality of store memory accesses. Coupled to the first buffer, the first control unit is configured to select at least one of the plurality of store memory accesses for cache access, and wherein the selected store memory access is speculative. The cache is coupled to receive the selected store memory access, and is configured to read first data from a cache line accessed by the selected store memory access. Additionally, the cache is configured to store second data corresponding to the selected store memory access into the cache line subsequent to reading the first data. The second buffer is coupled to the cache and is configured to store the first data. The first control unit is configured to receive an indication that the selected store memory access is incorrectly executed. In response to the indication, the first control unit is configured to convey the selected store memory access to the cache. The cache is configured to store the first data into the cache line in response to the indication, whereby the first data is restored to the cache line when the selected store memory access is incorrectly executed.

The present invention further contemplates a method for performing speculative store memory accesses in a microprocessor, comprising several steps. First data is read from a cache line accessed by a store memory access. Second data corresponding to the store memory access is stored into the cache line subsequent to the reading. The first data is restored to the cache line in response to an indication that the store memory access is incorrectly executed.

BRIEF DESCRIPTION OF THE DRAWINGS

Other objects and advantages of the invention will become apparent upon reading the following detailed description and upon reference to the accompanying drawings in which.

Figure 1:
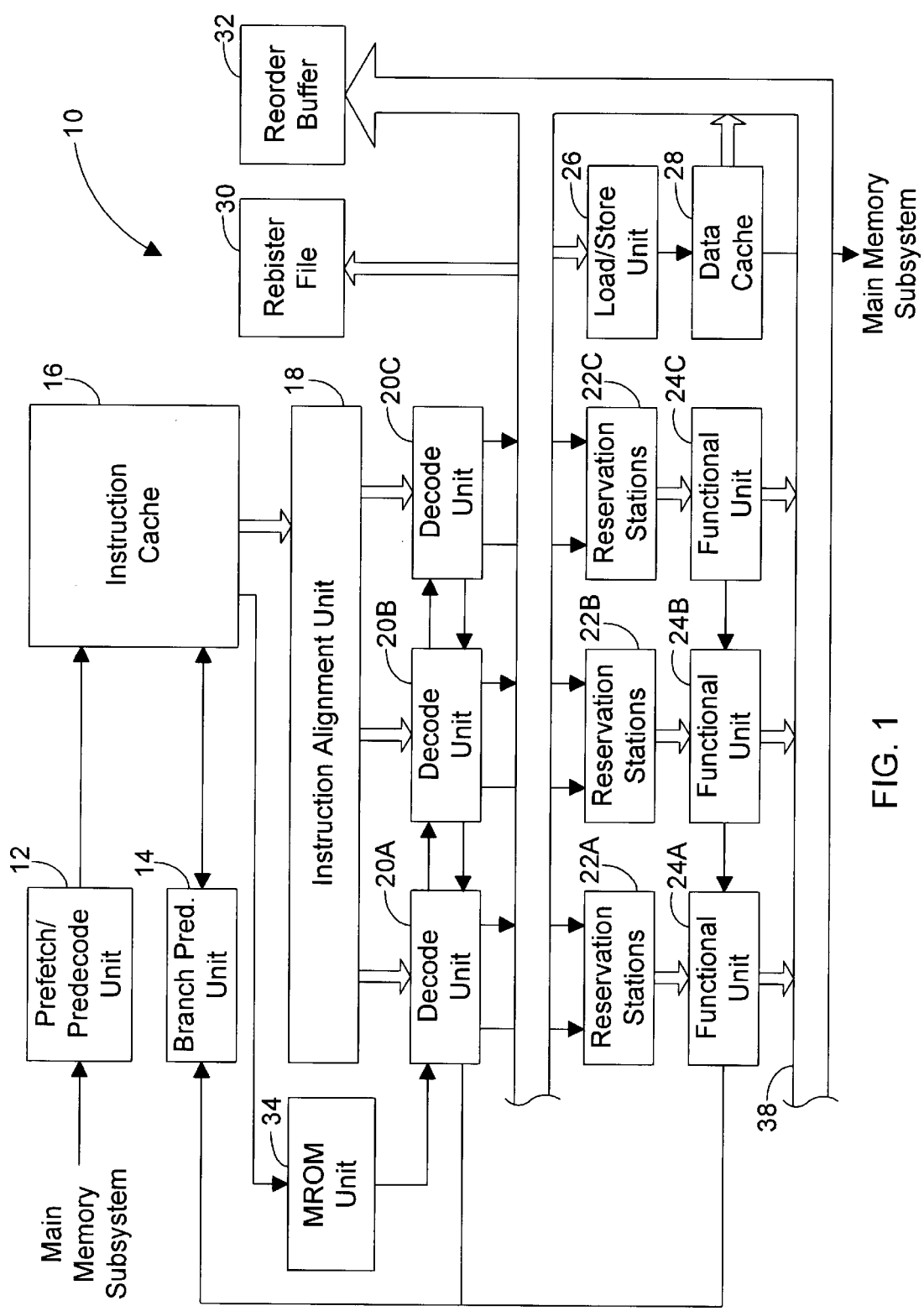
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Blocks referred to herein with a reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is coupled to instruction cache 16. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, load/store unit 26 and data cache 28 operate together to perform speculative store memory accesses. Load/store unit 26 selects a speculative store memory access for performance based upon a predetermined set of criteria, and conveys the store memory access to data cache 28. Prior to performing the store, data cache 28 copies the corresponding data within the affected cache line into a restore buffer. Load/store unit 26 retains the speculative store memory access until either the store memory access retires or until an indication to restore the speculative store memory accesses is received. Speculative stores are restored (i.e. the cache line is returned to the pre-store state) if an instruction prior to the speculative stores is a mispredicted branch or an instruction which experiences an exception. Additionally, a restore is performed if a snoop is detected which requires data cache 28 to write a cache line to main memory. It is noted that, in the case of a restore in response to a snoop, the store memory access is retained by load/store unit 26 and performed to data cache 28 again after the snoop is serviced. Load/store unit 26 conveys the address of a store requiring restoration, and asserts a restore indication to data cache 28. Data cache 28 accesses the restore buffer and writes the data stored therein to the cache line accessed by the speculative store address. The original data is thereby restored to the cache line. Advantageously, store memory accesses are performed speculatively. Since the store memory access has already been performed, the store memory access may immediately be cleared from the load/store buffer when reorder buffer 32 indicates that the store is ready to be retired. Performance may be increased by more efficient release of load/store buffer space. Additionally, reorder buffer 32 may progress to retiring subsequent instructions more quickly. Reorder buffer efficiency may thereby be increased. Still further, store throughput may be increased. Previously, stores were indicated to be non-speculative during a clock cycle. The store then accessed data cache 28 and determined if the store hit the cache before indicating to reorder buffer 32 that the store is complete and clearing the corresponding load/store buffer storage location. Subsequent stores were not indicated as non-speculative until the cache access and hit determination were made. Because cache access and hit determination are performed prior to indication that the store is non-speculative in load/store unit 26, the store may be completed immediately upon non-speculative indication. The ability to restore the original data to the cache line enables correct operation in the case of incorrect execution of the speculative store or a snoop hit.

As opposed to many prior load/store units, load/store unit 26 does not perform forwarding of store data to subsequent load memory accesses. Instead, since the store is speculatively performed to data cache 28, the loads may access data cache 28. Dependency checking between loads and stores prior to the speculative performance of the store stalls the load memory access until the corresponding store memory access has been performed. Advantageously, forwarding logic is not employed by load/store unit 26. Similar functionality is obtained through the performance of load memory accesses to data cache 28. Additionally, speculative loads which are partially overlapped by a prior speculative store may be performed more efficiently. Data cache 28, subsequent to the speculative store, contains each of the bytes accessed by the load.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 16 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

|  |  |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocated the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction i s reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction . It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated similar to load/store unit 26 in that any of decode units 20 may dispatch instructions to the floating point unit.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. Results may be conveyed upon a plurality of result buses 38.

Load/store unit 26 provides an interface between functional units 24 and data cache 28. In one embodiment, load/store unit 26 is configured with a load/store buffer having eight storage locations for data and address information for pending load or store memory accesses. Decode units 20 arbitrate for access to the load/store unit 26. When the buffer is full, a decode unit must wait until load/store unit 26 has room for the pending load or store request information. Load/store unit 26 also performs dependency checking for load memory accesses against pending store memory accesses to ensure that data coherency is maintained. Additionally, load/store unit 26 may include a special register storage for special registers such as the segment registers and other registers related to the address translation mechanism defined by the x86 microprocessor architecture.

Load/store unit 26 is configured to perform load memory accesses speculatively. Store memory accesses are performed in program order, but may be speculatively stored into the predicted way. If the predicted way is incorrect, the data prior to the store memory access is subsequently restored to the predicted way and the store memory access is performed to the correct way. Stores may be executed speculatively as well. Speculatively executed stores are placed into a restore buffer, along with a copy of the cache line prior to the update. If the speculatively executed store is later discarded due to branch misprediction, exception, or snoop, the cache line may be restored to the value stored in the buffer.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
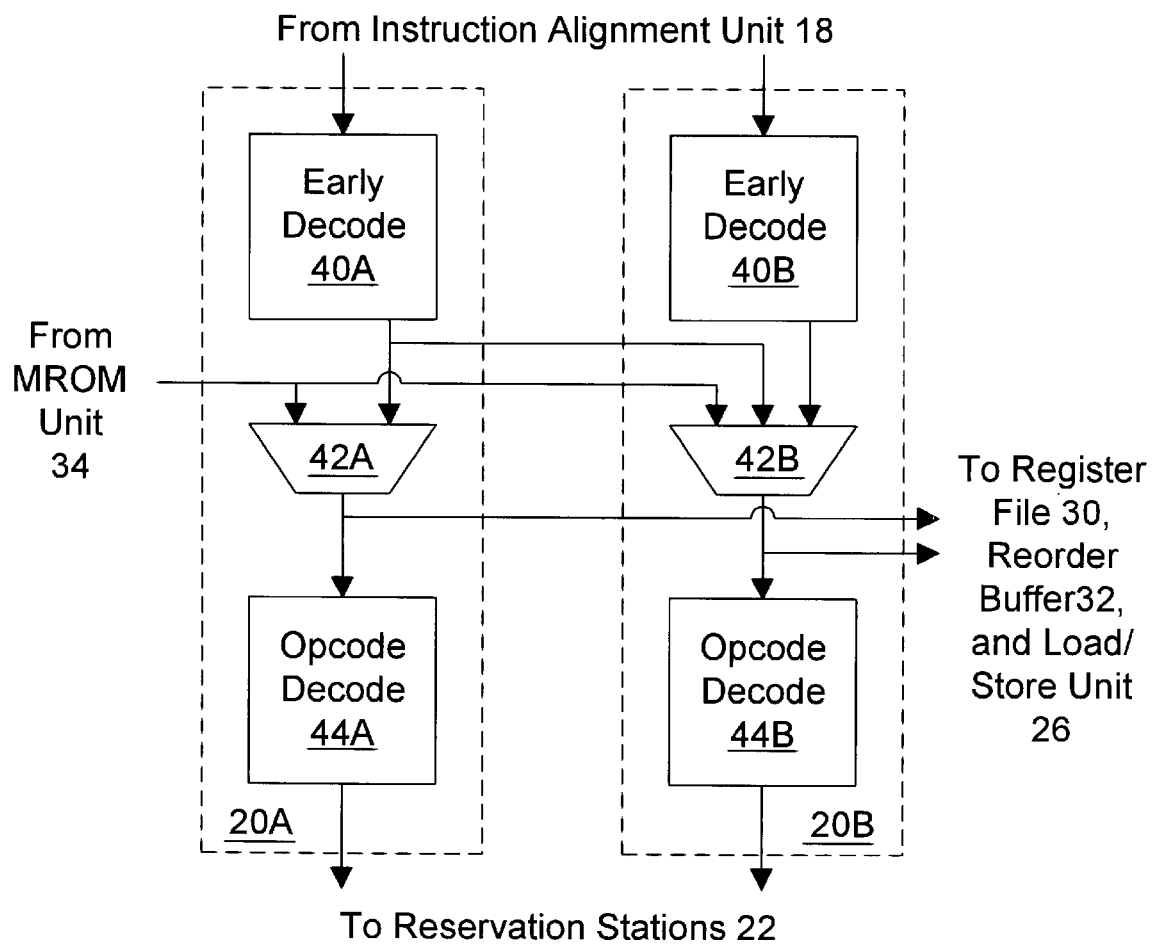
FIG. 2 is a block diagram of a pair of decode units shown in FIG. 1, according to one embodiment of the microprocessor.

Turning now to FIG. 2, a block diagram of one embodiment of decode units 20A and 20B are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20A comprises early decode unit 40A, multiplexor 42A, and opcode decode unit 44A. Similarly, decode unit 20B includes early decode unit 40B, multiplexor 42B, and opcode decode unit 44B.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42A is included for selecting between the instructions provided by MROM unit 34 and by early decode unit 40A. During times in which MROM unit 34 is dispatching instructions, multiplexor 42A selects instructions provided by MROM unit 34. At other times, multiplexor 42A selects instructions provided by early decode unit 40A. Similarly, multiplexor 42B selects between instructions provided by MROM unit 34, early decode unit 40A, and early decode unit 40B. The instruction from MROM unit 34 is selected during times in which MROM unit 34 is dispatching instructions. During times in which early decode unit 40A detects a fast path instruction having an SIB byte, the instruction from early decode unit 40A is selected by multiplexor 42B. Otherwise, the instruction from early decode unit 40B is selected. When early decode unit 40A detects a fast path instruction having an SIB byte, an instruction for calculating the address specified by the SIB byte is dispatched to opcode decode unit 44A. Opcode decode unit 44B receives the fast path instruction.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
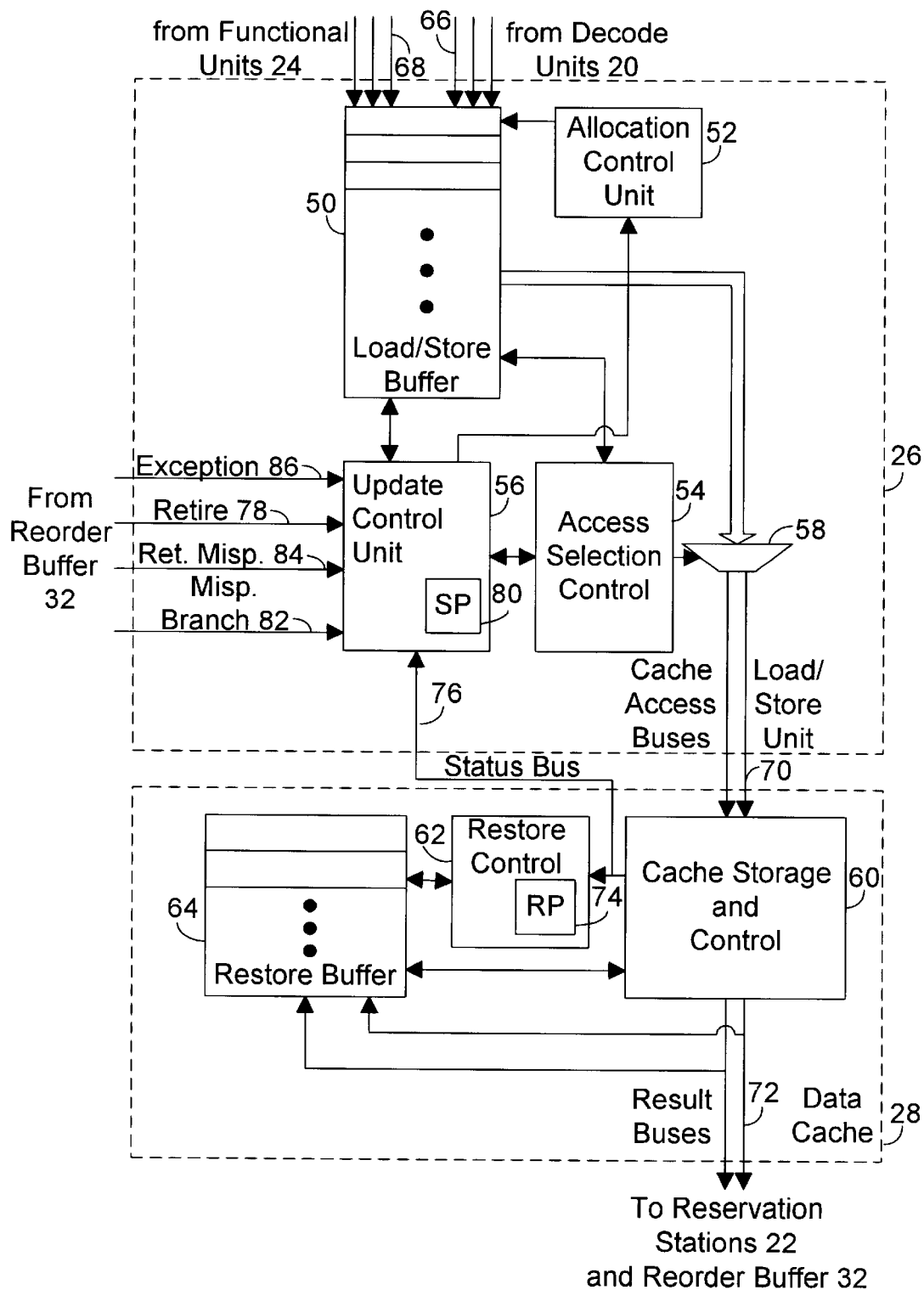
FIG. 3 is a block diagram of a load/store unit and a data cache shown in FIG. 1, according to one embodiment of the microprocessor.
Figure 3A:
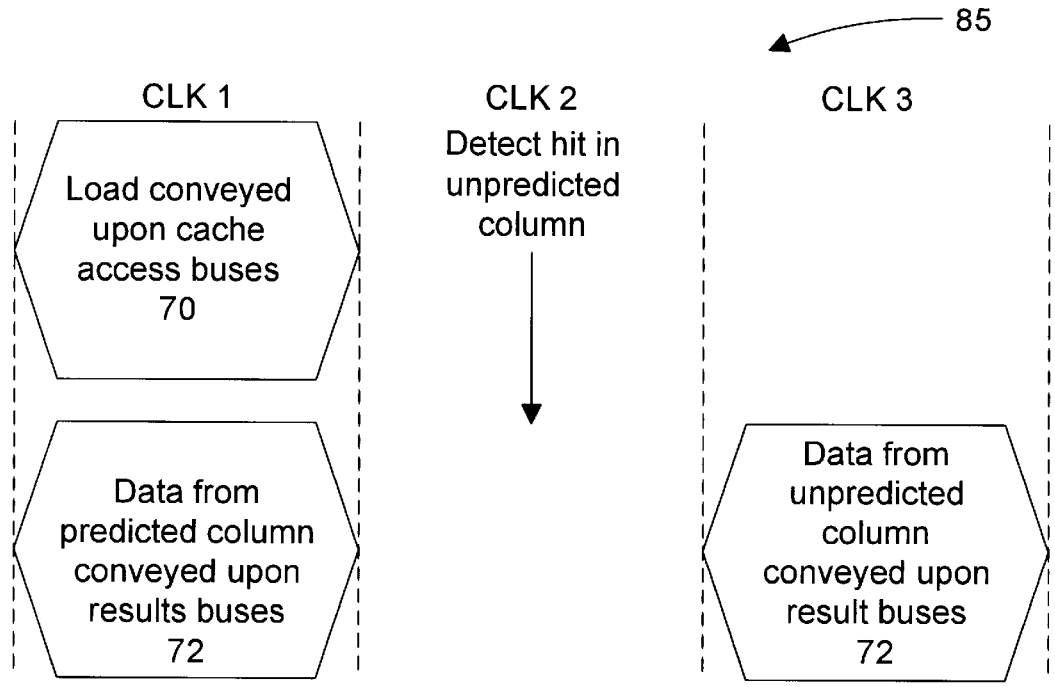
FIG. 3A is a timing diagram showing events for a load memory access which hits in an unpredicted column.
Figure 3B:
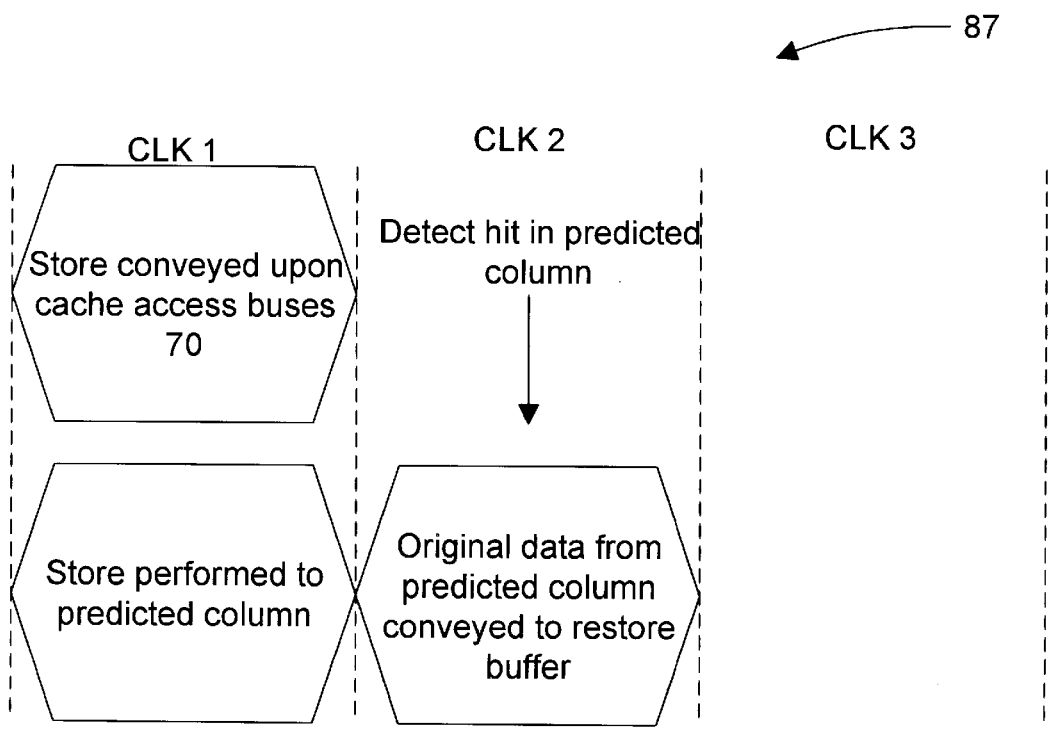
FIG. 3B is a timing diagram showing events for a store memory access which hits in a predicted column.
Figure 3C:
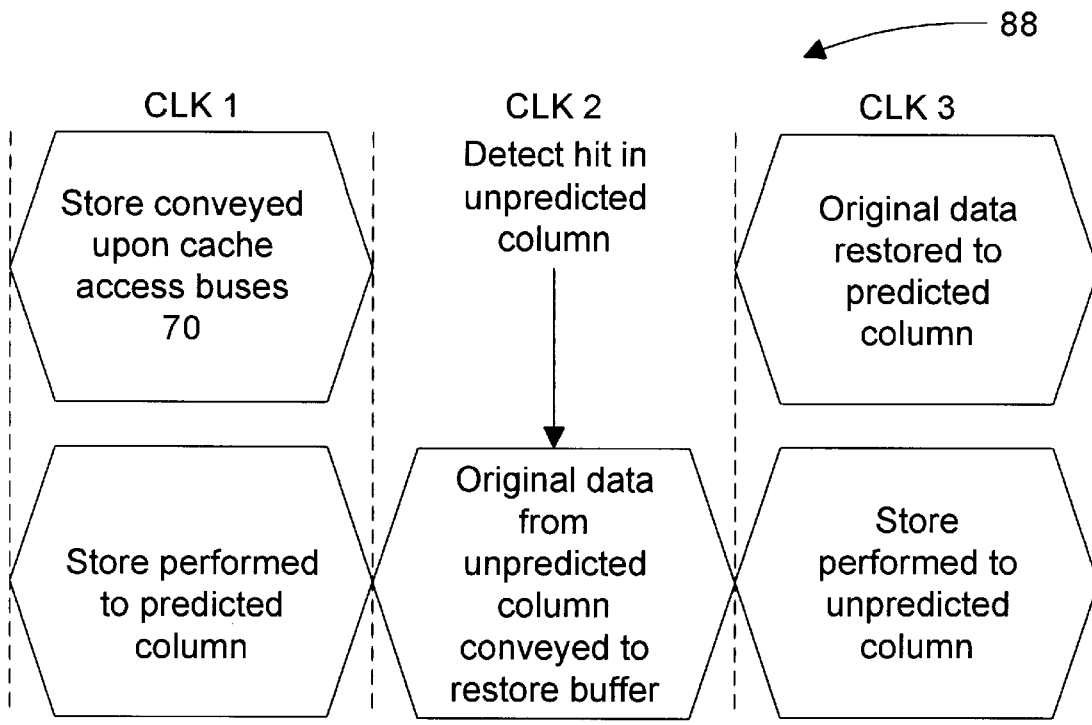
FIG. 3C is a timing diagram showing events for a store memory access which hits in an unpredicted column.
Figure 3D:
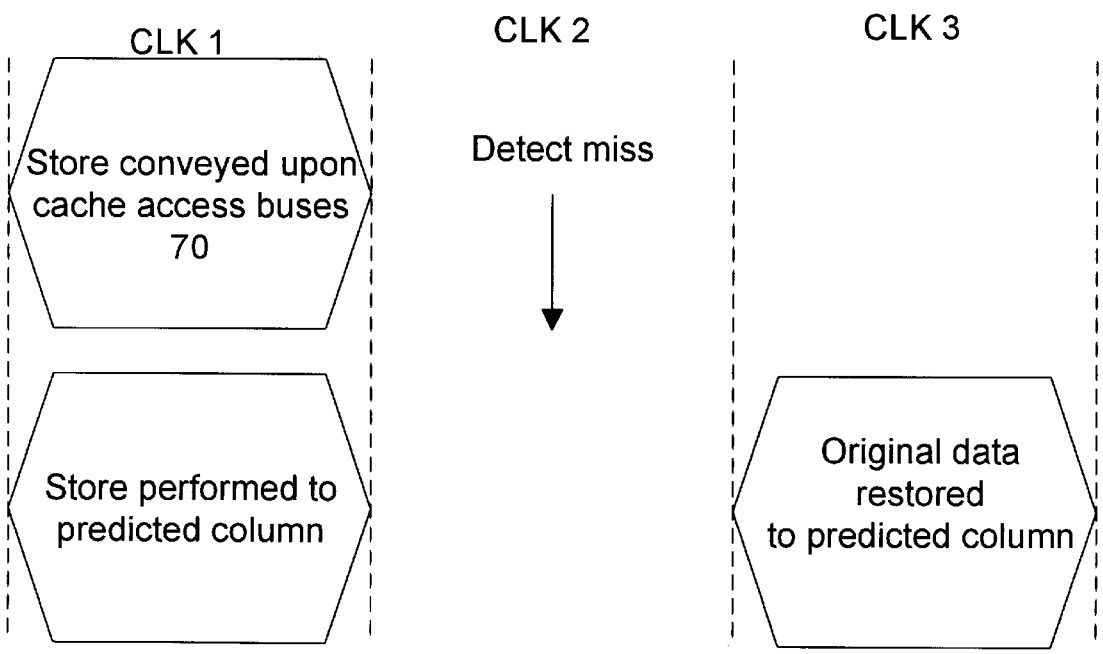
FIG. 3D is a timing diagram showing events for a store memory access which misses.

Turning next to FIG. 3, a block diagram of one embodiment of load/store unit 26 and data cache 28 is shown. Load/store unit 26 includes a load/store buffer 50, an allocation control unit 52, an access selection control unit 54, an update control unit 56, and a selection device 58. Data cache 28 includes a cache storage and control block 60, a restore control unit 62, and a restore buffer 64. Load memory accesses and store memory accesses may be referred to as loads and stores, respectively, for brevity.

Generally speaking, speculative store requests may be conveyed from load/store buffer 50 to cache storage and control block 60. Cache storage and control block 60 reads the original data (i.e. data prior to performing the store operation) from the affected cache line. Subsequently, cache storage and control block 60 stores the data associated with the store into the affected cache line. The original data is stored in restore buffer 64. Update control unit 56 receives indications from reorder buffer 32 of mispredicted branches, exceptions, and loads and stores which are ready to be retired. If a mispredicted branch is detected, speculative store operation is halted. When the mispredicted branch instruction is retired, those stores which have been speculatively performed and which were in the buffer when the mispredicted branch instruction was detected are restored. If an exception or snoop access requiring a writeback response is detected, speculative stores are also restored.

When speculative stores are restored, load/store unit 26 conveys the most recently performed speculative store as a restore operation to data cache 28. Data cache 28 retrieves the most recent data from restore buffer 64 and stores the data into the corresponding cache line within cache storage and control block 60. Load/store unit 26 continues restoring with the next most recently performed speculative store, until all outstanding speculative stores have been restored. Restore buffer 64 provides next most recently stored data for each restore operation, thereby providing the original data prior to each speculative store. The stores are restored in the reverse order (i.e. most recently performed to least recently performed) from the order in which they were performed. The reverse order ensures that multiple speculative stores to the same cache line are restored correctly, such that the cache line is returned to the value it contained prior to the multiple speculative stores.

Load/store buffer 50 is coupled to a plurality of decode request buses 66 from decode units 20, and to a plurality of functional unit result buses 68 from functional units 24. Functional unit result buses 68 may form a portion of result buses 38 (shown in FIG. 1). Decode units 20 decode instructions, conveying indications of loads and/or stores associated with the instructions to load/store unit 26 upon decode request buses 66 (one from each decode unit 20A–20C). Loads and stores are accepted into load/store buffer 50 under the control of allocation control unit 52. If not all of the requests conveyed upon request buses 66 may be accepted (i.e. due to a lack of free storage locations within load/store buffer 50), requests from decode unit 20A are given highest priority. Requests from decode unit 20B are given next highest priority, followed by requests from decode unit 20C. Memory accesses are thereby stored into load/store buffer 50 in program order, according to the embodiment shown. The program order of a pair of accesses within load/store buffer 50 may be determined via their respective storage locations. Load and store memory access addresses are calculated by functional units 24, and the addresses are forwarded to load/store unit 26 upon functional unit result buses 68 (one from each functional unit 24). Allocation unit 52 directs the received addresses to the respective load and store memory operations, as 30 identified by a reorder buffer tag for the associated instruction. Data for stores is also provided by functional units 24 upon functional unit result buses 68.

In the embodiment shown, allocation unit 52 maintains a pointer to a storage location within load/store buffer 50. The pointer indicates the location to be allocated to the next load/store request from decode units 20. When operations are removed from load/store buffer 50, the remaining operations are shifted down such that the operation which is prior to each other operation within load/store buffer 50 is at the bottom of the buffer. Remaining operations are stored in order up to the storage location indicated by the pointer. It is noted that load/store buffer 50 may be operated in any suitable fashion.

Load/store buffer 50 comprises a plurality of storage locations for storing memory operations (i.e. load and store memory accesses). In one embodiment, eight storage locations are included. The operations stored within load/store buffer 50 are conveyed to selection device 58. Under the control of access selection control unit 54, selection device 58 selects up to two memory accesses to be performed to data cache 28 during a clock cycle. Cache access buses 70 emanate from selection device 58 and are coupled to cache storage and control block 60. It is noted that selection device 58 may comprise a plurality of multiplexor circuits for selecting operations from the set of operations conveyed thereto.

Access selection control unit 54 selects memory accesses from load/store buffer 50 which fulfill the selection criteria for cache access. In one embodiment, a load memory access may be selected for cache access if the following criteria are met: (i) the load memory address has been calculated; (ii) store memory accesses prior to the load memory access in load/store buffer 50 have calculated addresses; and (iii) the stores are not to the same index within data cache 28 as the load memory address. Criterion (ii) ensures that a load does not speculatively bypass a store upon which the load depends prior to the store receiving an address. Criterion (iii) ensures that a load does not bypass a store upon which it may depend after the address is calculated. It is noted that, by comparing indexes as specified by criterion (iii), loads do not bypass a store to the same physical address even if the linear addresses differ. Loads thereby bypass misses in load/store buffer 50, as well as stores to dissimilar indexes.

For this embodiment, store memory accesses may be selected for cache access if the following criteria are met: (i) the store memory address has been calculated and the store data has been provided; (ii) the store memory address is aligned or the store is non-speculative; (iii) memory accesses prior to the store memory access have been performed and have not missed data cache 28; and (iv) no more than three speculative store memory accesses are outstanding. Store memory accesses are thereby performed in program order with respect to other memory accesses. In particular, the store selection criteria does not include an indication that the store is indicated as ready for retirement by reorder buffer 32. Therefore, stores may be selected for cache access while the stores are speculative. It is noted that, in cases in which more than two memory accesses fulfill the above listed criteria, the qualifying memory accesses which are nearest the bottom of load/store buffer 50 are selected. In other words, the qualifying memory accesses which are foremost in program order are selected.

Cache storage and control block 60 comprises a cache storage for data and tag addresses, as well as associated control circuitry. In one embodiment, data cache 28 is a set-associative cache. Cache storage and control block 60 receives the cache accesses upon cache access buses 70, and performs the appropriate actions (read or write) dependent upon the type of cache access. Among the information conveyed to cache storage and control block 60 upon cache accesses bus 70 is an indication of the load or store (read or write) nature of the request, the address, the number of bytes to be accessed, the store data (for stores), and a restore indication. For load memory accesses, the corresponding data is conveyed upon result buses 72 to reservation stations 22 and reorder buffer 32. Additionally, result buses 72 are coupled to restore buffer 64 for speculative store memory accesses. Data corresponding to each speculative store, prior to the store being performed, is conveyed upon result buses 72. Restore control unit 62 causes the data to be stored into storage locations within restore buffer 64. Restore control unit 62 maintains a restore pointer (stored in storage location 74) which indicates the storage location to be allocated to data from a store memory access. For a set associative cache, restore buffer 64 additionally stores the column (or way) of the cache in which the affected line is stored. When data is stored into restore buffer 64, restore control unit 62 increments the pointer. Subsequent store data may thereby be stored into restore buffer 64.

Cache storage and control block 60 conveys status information regarding each cache access upon status bus 76 to update control unit 56. The status information includes a hit/miss status for each access. Update control unit 56 updates the control information for each corresponding operation within load/store buffer 50 in response to the status information. If a load operation is a hit, the load operation is deleted from load/store buffer 50. If a load operation is a miss, the operation is marked as a miss. Load/store unit 26 retains the load miss until the miss is non-speculative (i.e. the load's reorder buffer tag is conveyed upon retire bus 78 from reorder buffer 32). The miss is then serviced by fetching the corresponding cache line from main memory. Non-speculative stores (i.e. stores which are indicated upon retire bus 78) operate similar to loads except that misses are not be fetched from main memory, according to the present embodiment. Instead, the store data is written to main memory. Other embodiments may fetch the cache line, similar to loads. Speculative stores are retained within load/store buffer 50 until the stores become non-speculative. In this manner, if the speculative stores are performed incorrectly, restore actions may be performed using the speculative store address. When operations are deleted from load/store buffer 50, update control unit 56 informs allocation control unit 52 such that the pointer indicating the next storage location to be allocated is adjusted accordingly.

It is noted that in one embodiment, retire bus 78 is configured to convey reorder buffer tags of up to two memory accesses which are ready to be retired (i.e. the memory accesses are non-speculative). Update control unit 56 compares the reorder buffer tags to operations within the buffer and interprets the operations as non-speculative. Once any required actions are completed, update control unit 56 informs reorder buffer 32 that the corresponding operations are complete and the associated instructions may be retired. For speculative stores, an indication upon retire bus 78 may be immediately followed by a response from load/store unit 26. The corresponding speculative stores may be deleted from load/store buffer 50 upon retirement.

Restore control unit 62 receives status bus 76 as well. If an operation is a store and the operation is a hit, then restore control unit 62 increments the restore buffer pointer stored in storage location 74. If the operation is not a store or is a miss, then restore control unit 62 does not increment the pointer. In this manner, original data for store accesses is stored into restore buffer 64.

Update control unit 56 maintains a store pointer (in storage location 80) indicative of the storage location within load/store buffer 50 which stores the most recent speculatively performed store. When store memory operations are performed, the pointer is incremented to indicate the storage location of the store operation. As operations are deleted from load/store buffer 50, the pointer is updated to continue indicating the most recently performed store.

A mispredicted branch conductor 82 and a retire mispredicted branch conductor 84 are coupled between reorder buffer 32 and update control unit 56. When a mispredicted branch instruction is detected, a signal is asserted upon mispredicted branch conductor 82. In response to the signal, load/store unit 26 halts speculative store execution. When the mispredicted branch instruction is retired (as indicated by an asserted signal upon retire mispredicted branch conductor 84), the operations which are subsequent to the mispredicted branch instruction along the mispredicted path of the instruction stream still remain within load/store buffer 50. These speculatively performed stores are restored to data cache 28.

The restore operations are handled by update control unit 56, in concert with access selection control unit 54 and restore control unit 62. Update control unit 56 selects the store indicated by the store pointer within storage location 80, and indicates the selection to access selection control unit 54. Access selection control unit 54 selects the operation for conveyance to cache storage and control block 60. Additionally, the restore indication is asserted for the access upon cache access buses 70. Cache storage and control block 60 receives the restore indication, and indexes the cache with the associated address. The data for the restore is read from restore buffer 64 according to the restore pointer stored in storage location 74. For set associative caches, the column of the affected cache line is read from restore buffer 64 as well. Accordingly, the original data corresponding to the store is restored to the affected cache line. Both the speculative store pointer and the restore pointer are updated to indicate the next most recent speculative store and corresponding original data, and the restored speculative store may be discarded from load/store buffer 50. These restore actions are repeated by load/store buffer 50 until each speculative store has been restored (i.e. until the speculative store pointer points to the bottom of load/store buffer 50). It is noted that microprocessor 10 may fetch instructions from the correct instruction stream immediately upon detection of a mispredicted branch. Load/store unit 26 halts speculative store operation upon such detection in order to simplify speculative store restoration. Upon retirement of a mispredicted branch, speculative stores within load/store buffer 50 are from the mispredicted path and therefore are restored. If speculative store operation continued after mispredicted branch detection, some of the speculative stores within load/store buffer 50 upon retirement of the mispredicted branch might be from the correct path. A mechanism for discerning which speculative stores to restore would be employed. Such embodiments are within the spirit and scope of the present invention. Upon completion of the restoration process, speculative store operation resumes.

When an instruction which causes an exception is retired, reorder buffer 32 asserts a signal upon exception conductor 86. In response to the signal, update control unit 56 performs restore operations for all outstanding speculative stores. The operations performed are similar to the mispredicted branch retirement case. When an exception is signalled, all outstanding loads and stores are discarded (following any restoring actions). Similarly, if a snoop access which causes a writeback is detected by the physical tags (not shown), the speculative stores are restored prior to performing the writeback. It is noted that a snoop access occurs when an external device coupled to the main memory subsystem accesses memory. The address being accessed is checked against addresses stored in the caches, to ensure that any updates performed by microprocessor 10 to the accessed memory locations are visible to the accessing device. Otherwise, the device may read data from main memory which does not include the updates, violating memory coherency rules. Additionally, if a device updates a memory location, then caches upon microprocessor 10 invalidate the corresponding cache line. In this manner, subsequent accesses to the memory location by microprocessor 10 receive the updated data.

In addition to storing data and tag addresses, cache storage and control block 60 stores the state of each cache line. The state indicates the validity of the line, as well as whether or not the line has been modified. A particularly popular state encoding, the MESI state encoding, is employed according to one embodiment. The MESI state encoding includes four states: Modified, Exclusive, Shared, and Invalid. Modified indicates that the cache line is valid in the cache and is modified with respect to main memory. Exclusive indicates that the cache line is valid in the cache and not modified. Additionally, no other device which shares main memory with microprocessor 10 stores a copy of the cache line. Shared indicates that the cache line is valid in the cache and not modified. Additionally, other devices which share main memory with microprocessor 10 may store a copy of the cache line. Invalid indicates that the cache line is not valid in the cache. According to this embodiment, stores are not performed to the cache if the cache line is in the exclusive state. If the cache line is exclusive, the store is not performed and the cache line is changed to the modified state in accordance with MESI coherency rules. The store may then be performed. If the cache line is in the modified state, the store is performed. If the cache line is in the shared state, non-speculative stores are performed to the cache as well as to the main memory subsystem. Other caches which may be storing the cache line (i.e. in other microprocessors) invalidate the line when the main memory subsystem is updated. Additionally, the cache line within cache storage and control block 60 may be changed to the exclusive state. In this manner, microprocessor 10 ensures that no other device is storing a copy of the affected cache line. Speculative stores to a shared cache line are held until they are non-speculative. Additionally, for embodiments in which data cache 28 is linearly addressed, the physical tags are updated to the modified state prior to the store for cache snooping purposes.

In the embodiment shown, restore buffer 64 is operated as a "circular buffer". A circular buffer is a buffer in which the storage locations are used in a rotating fashion, such that each storage location is used prior to the reuse of the first storage location used. For example, a circular buffer having four storage locations numbered zero through three (consecutively), may use storage location zero, then storage location one, then storage location two, then storage location three, then storage location zero, etc. If values are stored into a circular buffer by incrementing through the storage locations, the values may be retraced in the reverse order by decrementing through the storage locations. Due to this reverse order retracing ability, the circular buffer is ideal for use as restore buffer 64. Data is added to restore buffer 64, and may be retraced in reverse order to perform restore activities. In one embodiment, restore buffer 64 includes four storage locations. Load/store unit 26 ensures that no more than four speculative stores are simultaneously outstanding via criterion (iv) of the store selection criteria.

It is noted that restore buffer 64 may be operated in fashions other than a circular buffer. For example, restore buffer 64 may be operated as a stack in which the most recently stored data is always within a particular storage location identified as the top of restore buffer 64. Previous entries are shifted down (i.e. away from the top) as new entries are added. Other configurations of restore buffer 64 may also be used, as long as data may be stored into restore buffer 64 and retraced in the reverse order for performing restores of speculative stores.

In one particular embodiment, data cache 28 comprises a "banked" cache having eight banks. In a banked cache, the bytes of a particular cache line are stored in a plurality of banks. When a cache access is performed, only the bank including the requested bytes is accessed. By configuring the cache into banks, multiple accesses may be performed concurrently without constructing a full dual ported array, which is more complex and larger than the banked cache. Speculative store memory accesses affect only one bank. Restore buffer 64 is configured with sufficient storage in each storage location for storing bytes corresponding to a single bank. It is noted that, for this embodiment, loads and stores are defined to be unaligned if they access more than one bank.

Continuing with the particular embodiment, cache storage and control block 60 employs way prediction for selecting a column for a particular access. Data is routed upon result buses 72 in response to cache access upon cache access buses 70 during a clock cycle. For stores, data is speculatively stored into the predicted column. However, the corresponding hit/miss information is not available until the following clock cycle. Additionally, hit/miss information may indicate a hit in the predicted column, a hit in one of the unpredicted columns, or a miss. Misses are handled as described previously, and hits in the predicted column are similar to the cache hit case described above. However, a hit in an unpredicted column causes corrective actions to be taken. The way prediction is updated to indicate the column which hits. Additionally, the data from the correct way is conveyed during the third clock cycle for loads. Similarly, the original data from the predicted column is restored to the predicted column during the third clock cycle. Original data from the unpredicted column which hits is conveyed to restore buffer 64 during the second clock cycle. Original data from the predicted column is captured internally by cache storage and control block 60 in order to perform restoration due to a hit in an unpredicted column or a miss. For a store miss, original data for the predicted column is restored internally by cache storage and control block 60 and the store is retained in load/store buffer 50 for performance when the store becomes non-speculative. It is noted that load/store unit 26 cancels an access to data cache 28 during a third clock cycle for load or store hits in unpredicted columns and for store misses during a first clock cycle prior to the third clock cycle. Cache storage and control block 60 uses the idle port(s) on the cache to perform the restoration actions.

Exemplary timing diagrams 85, 87, 88, and 89 showing a hit in an unpredicted column for a load, hit in a predicted column for a store, hit in an unpredicted column for a store, and store miss are shown as FIGS. 3A, 3B, 3C, and 3D, respectively Clock cycles are separated by vertical dashed lines. It is noted that, for embodiments employing timing similar to the timing diagrams of FIGS. 3A–3D, a separate bus from result buses 72 may be used to convey data to restore buffer 64.

Figure 4A:
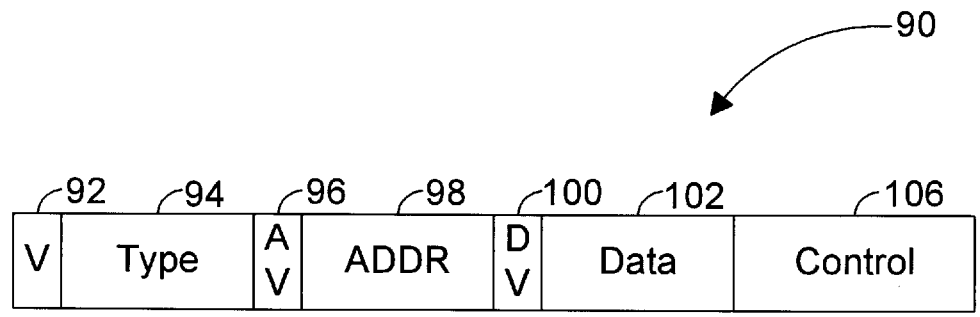
FIG. 4A is a diagram showing information stored in a load/store buffer within the load/store unit shown in FIG. 3, according to one embodiment of the load/store unit.

Turning now to FIG. 4A, a diagram of an exemplary storage location 90 from load/store buffer 50 is shown according to one embodiment of load/store buffer 50. Storage location 90 includes a valid field 92, a type field 94, an address valid field 96, an address field 98, a data valid field 100, a data field 102, and a control field 106.

Valid field 92 comprises a bit indicative, when set, that storage location 90 is storing a load or store memory access. When clear, the bit indicates that storage location 90 is not storing a load or store memory access (i.e. storage location 90 is empty). Address valid field 96 and data valid field 100 comprise bits as well. Address valid field 96 indicates the validity of address field 98, while data valid field 100 indicates the validity of data field 102. Type field 94 identifies the type of memory access stored in location 90. Type field 94 includes a pair of bits in one embodiment. The first of the pair of bits is indicative, when set, of a load memory access. The second of the pair of bits is indicative, when set, of a store memory access. This encoding allows a load and a store memory access which are derived from the same instruction to be stored in the same storage location 90.

Address field 98 stores the address associated with the memory access. The address is provided by a functional unit 24, and may be provided during a different clock cycle than the memory access is placed into load/store buffer 50. In one embodiment, address field 98 includes 32 bits for storing a 32 bit address. Data field 102 stores the data associated with a store memory access. In one embodiment, data field 102 comprises 32 bits for storing up to 32 bits of store data.

Control field 106 stores additional control information regarding memory accesses. In one embodiment, control field 106 includes a reorder buffer tag identifying a storage location within reorder buffer 32 which stores an instruction corresponding to the memory access. Additionally, an accessed bit is included indicating that the memory access was selected for cache access during the previous clock cycle. The memory access is thereby prevented from being selected by access selection control unit 54 during the clock cycle, in which cache hit information is provided upon status bus 76. A size is included for indicating the number of bytes operated upon by the memory access. Still further, a pair of miss bits are included for indicating that cache misses were detected for an access. Two bits are included for the possibility of unaligned accesses missing in either one of their two access to data cache 28. A serialize bit indicates that the memory access should not be performed speculatively. Certain memory accesses, such as I/O accesses, are not performed speculatively because the access storage locations outside of microprocessor 10. A dependent bit indicates that a memory access is dependent upon a prior memory access. If the dependent bit is set, the memory access is not selected by address selection control unit 54. An unaligned bit indicates, when set, that the memory access is unaligned. Finally, a physical address bit indicates, when set, that the address in address field 98 is a physical address which must be checked against the physical tags to determine a cache hit or miss.

Figure 4B:
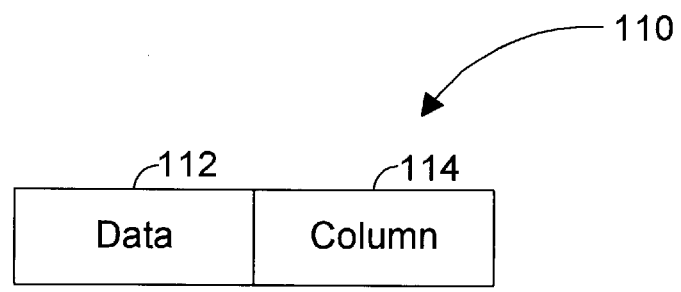
FIG. 4B is a diagram showing information stored in a restore buffer within the data cache shown in FIG. 3, according to one embodiment of the data cache.

Turning next to FIG. 4B, a storage location 110 within restore buffer 64 is shown according to one embodiment of restore buffer 64. Storage location 110 includes a data field 112 and a column field 114. Data field 112 stores the original data (i.e. the data prior to performance of the store) from the cache line affected by the corresponding speculative store. In one embodiment, data field 112 is configured to store data from one bank of data cache 28. In one particular embodiment, one bank of data comprises 32 bits. Column field 114 stores an indication of the column within data cache 28 from which the data in data field 112 was taken. Column field 114 is used to select the column to receive the data stored in data field 112 when a restore operation is performed using that data. In embodiments of data cache 28 employing a direct-mapped cache, column field 114 is eliminated.

Figure 5:
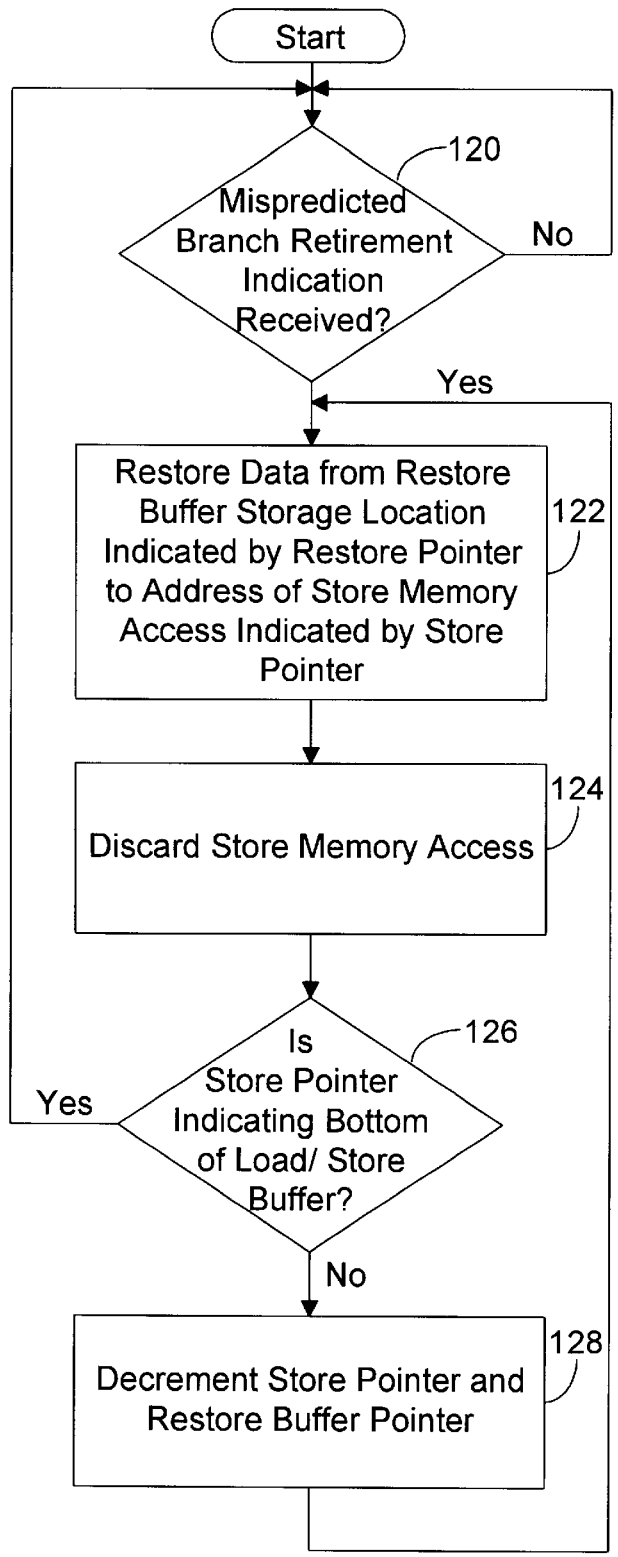
FIG. 5 is a flow chart illustrating operation of one embodiment of the load/store unit.

Turning to FIG. 5, a flow chart is shown indicating the steps employed for restoration of speculative stores following retirement of a mispredicted branch. Similar steps are performed for exceptions and snoop indications. Decision box 120 indicates whether or not a restoration should be performed. If retirement of a mispredicted branch is not detected, no restoration is performed. If retirement of a mispredicted branch is detected, restoration is performed.

The actions indicated by boxes 122 and 124 are performed for each speculative store within load/store buffer 50, beginning with the most recently performed speculative store (i.e. the speculative store indicated by the store pointer). Data is read from the restore buffer storage location indicated by the restore buffer pointer. The data is stored into data cache 28 in the row indicated by the address of the store and the column indicated by the restore buffer storage location. The store memory access may then be discarded from load/store buffer 50. It is noted that, in one embodiment, the store memory access is discarded if reorder buffer 32 indicates that the store memory access is discarded and the restore operation has been performed for the store memory access.

After completion of the restore for the current store memory access, load/store unit 26 determines if additional speculative stores remain to be restored. If the store pointer is indicating the bottom storage location of load/store buffer 50, then the restoration is completed. If the store pointer is indicating a storage location other than the bottom of load/store buffer 50, the restoration is not complete. The decision step is shown as decision box 126 in FIG. 5. If additional action is required, the store pointer and restore buffer pointer are both decremented to indicate the next most recent speculative store and corresponding original data (step 128). Load/store unit 26 returns to step 122 in the following clock cycle to continue the restoration process.

Figure 6:
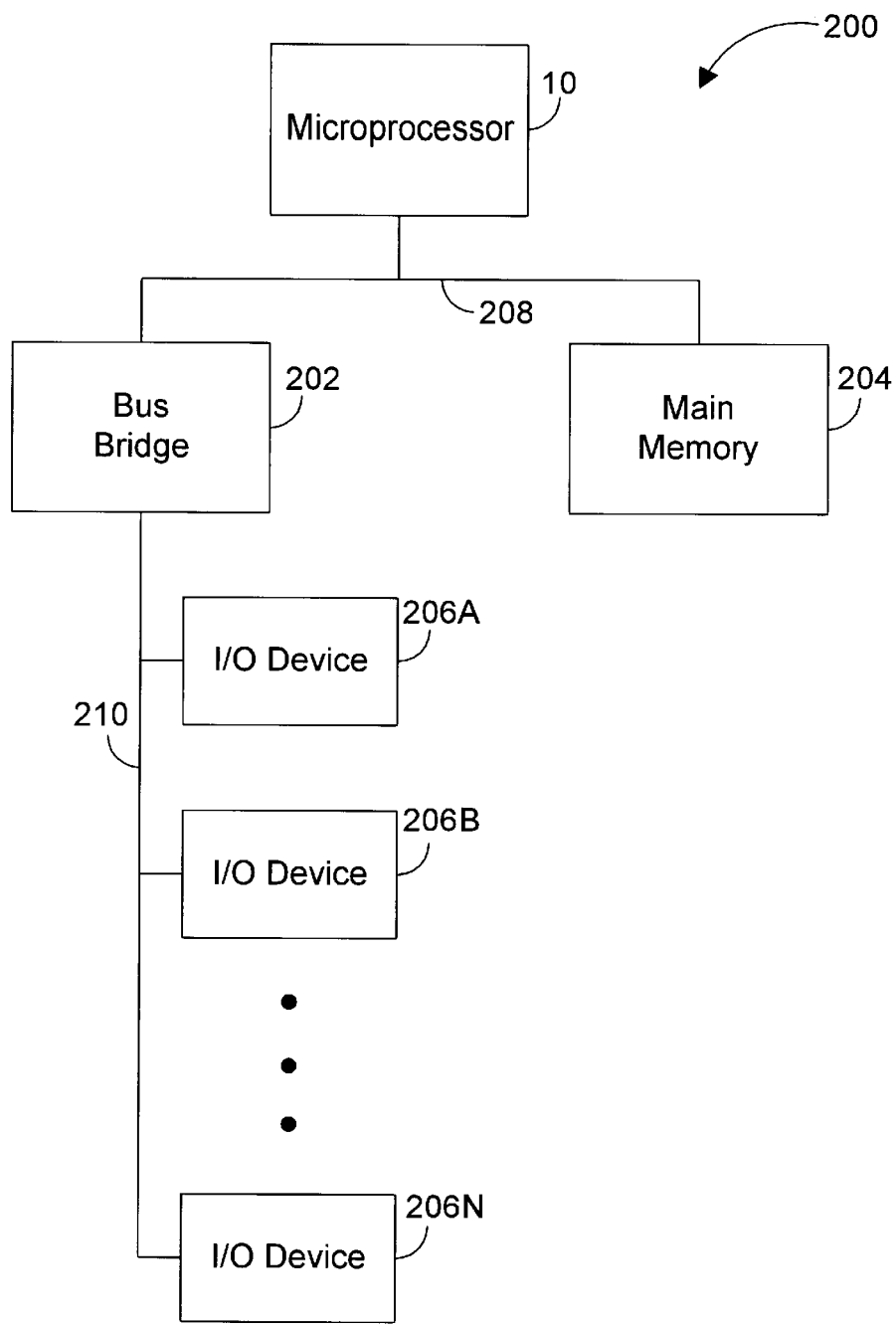
FIG. 6 is a block diagram of a computer system including the microprocessor shown in FIG. 1.

Turning now to FIG. 6, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 108 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 6 includes one microprocessor, other embodiments of computer system 200 may include multiple microprocessors. Similarly, computer system 200 may include multiple bus bridges 202 for translating to multiple. dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

It is noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

It is further noted that the terms most recently performed, next most recently performed, and least recently performed have been used herein to describe speculative store memory accesses. A speculative store is most recently performed among a set of speculative stores if it accessed the cache subsequent to each of the other speculative stores within the set. The next most recently performed speculative store is the speculative store which accessed the cache subsequent to each other speculative store within the set except for the most recently performed speculative store. The least recently performed speculative store access the cache prior to each other speculative store within the set.

Table 1 below indicates fast path, double dispatch, and MROM instructions for one embodiment of microprocessor 10 employing the x86 instruction set:

TABLE 1 x86 Fast Path, Double Dispatch, and MROM Instructions

| x86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path |
| CBW | fast path |
| CWDE | fast path |
| CLC | fast path |
| CLD | fast path |
| CLI | MROM |
| CLTS | MROM |
| CMC | fast path |

TABLE 1-continued x86 Fast Path, Double Dispatch, and MROM Instructions

| x86 Instruction | Instruction Category |
|---|---|
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV CR | MROM |
| MOV DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |

TABLE 1-continued x86 Fast Path, Double Dispatch, and MROM Instructions

| x86 Instruction | Instruction Category |
|---|---|
| OUTSD | MROM |
| POP | double dispatch |
| POPA | MROM |
| POPAD | MROM |
| POPF | MROM |
| POPFD | MROM |
| PUSH | double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | MROM |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note:
Instructions including an SIB byte are also considered fast path instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt; "Superscalar Microprocessor Including a High Performance Instruction Alignment Unit", Ser. No. 08/377,843, filed Jan. 25, 1995 by Witt, et al; "A Way Prediction Structure", Ser. No. 08/522,181, filed Aug. 31, 1995 by Roberts, et al; "A Data Cache Capable of Performing Store Accesses in a Single Clock Cycle", Ser. No. 08/521,627, filed Aug. 31, 1995 by Witt, et al; "A Parallel and Scalable Instruction Scanning Unit", Ser. No. 08/475,400, filed Jun. 7, 1995 by Narayan; and "An Apparatus and Method for Aligning Variable-Byte Length Instructions to a Plurality of Issue Positions", Ser. No. 08/582,473, filed Jan. 2, 1996 by Narayan, et al. The disclosure of these patent applications are incorporated herein by reference in their entirety.

In accordance with the above disclosure, an apparatus for performing speculative stores has been provided. The apparatus may advantageously improve the performance of a microprocessor employing the apparatus. Instead of waiting for an indication that the stores are non-speculative, the apparatus performs the stores speculatively. When the stores become non-speculative, they may retire without having to perform the store at that time. Additionally, store forwarding within the load/store unit of the microprocessor may be eliminated. Loads may access the data cache in order to retrieve the speculative store information.

Numerous variations and modifications will become apparent to those skilled in the art once the above disclosure is fully appreciated. It is intended that the following claims be interpreted to embrace all such variations and modifications.

What is claimed is:

1. An apparatus for performing speculative stores in a microprocessor, comprising:
   a first buffer configured to store a plurality of store memory accesses;
   a first control unit coupled to said first buffer, wherein said first control unit is configured to select at least one of said plurality of store memory accesses for cache access, and wherein said one of said plurality of store memory accesses is speculative;
   a cache coupled to receive said one of said plurality of store memory accesses, wherein said cache is configured to read first data from a cache line accessed by said one of said plurality of store memory accesses, and wherein said cache is further configured to store second data corresponding to said one of said plurality of store memory accesses into said cache line subsequent to reading said first data; and
   a second buffer coupled to said cache, wherein said second buffer is configured to store said first data;
   wherein said first control unit is configured to receive an indication that said one of said plurality of store memory accesses is incorrectly executed, and wherein said first control unit is configured to convey said one of said plurality of store memory accesses to said cache in response to said indication, and wherein said cache is configured to store said first data into said cache line in response to said indication, whereby said first data is restored to said cache line when said one of said plurality of store memory accesses is incorrectly executed.

2. The apparatus as recited in claim 1 wherein said cache is set associative.

3. The apparatus as recited in claim 2 wherein said second buffer is further configured to store a value indicative of a column within said cache corresponding to said cache line.

4. The apparatus as recited in claim 3 wherein said cache is configured to receive said value and to store said first data into said column of said cache.

5. The apparatus as recited in claim 1 wherein said indication is asserted in response to detection of a mispredicted branch instruction.

6. The apparatus as recited in claim 5 wherein said first control unit is further configured to halt further speculative store execution in response to detection of said mispredicted branch instruction.

7. The apparatus as recited in claim 6 wherein said first control unit is configured to receive a third indication indicative that said mispredicted branch instruction is retiring.

8. The apparatus as recited in claim 7 wherein said first control unit is configured to restore said first data upon assertion of said third indication.

9. The apparatus as recited in claim 1 wherein said indication is asserted in response to an exception-causing instruction.

10. The apparatus as recited in claim 9 wherein said first control unit is configured to restore said first data upon assertion of said indication.

11. The apparatus as recited in claim 1 wherein said second buffer comprises a circular buffer.

12. The apparatus as recited in claim 11 further comprising a second control unit configured to manage storage of said first data into said circular buffer.

13. The apparatus as recited in claim 12 wherein said second control unit is configured to maintain a pointer indicative of a top of said circular buffer.

14. The apparatus as recited in claim 1 wherein said first control unit is configured to concurrently select a plurality of said plurality of store memory accesses for cache access.

15. The apparatus as recited in claim 1 wherein said first control unit includes a pointer indicative of a most recently performed one of said plurality of store memory accesses.

16. The apparatus as recited in claim 15 wherein said first control unit is further configured to restore first data corresponding to said most recently performed one of said plurality of memory accesses in response to said indication.

17. The apparatus as recited in claim 16 wherein said first control unit is further configured to update said pointer to indicate a next most recently performed one of said plurality of memory accesses.

18. The apparatus as recited in claim 17 wherein said first control unit is further configured to restore first data corresponding to said next most recently performed one of said plurality of memory accesses.

19. The apparatus as recited in claim 1 wherein said cache is configured into a plurality of banks.

20. The apparatus as recited in claim 19 wherein said first data comprises data stored in one of said plurality of banks, wherein said one of said plurality of banks includes data modified by said one of said plurality of store memory accesses.

21. A method for performing speculative store memory accesses in a microprocessor, comprising:

reading first data from a cache line accessed by a speculative store memory access;

storing second data corresponding to said speculative store memory access into said cache line subsequent to said reading; and restoring said first data to said cache line in response to an indication that said speculative store memory access is incorrectly executed.

22. The method as recited in claim 21 wherein said indication comprises detection of a mispredicted branch instruction.

23. The method as recited in claim 21 wherein said indication comprises detection of an exception-causing instruction.

24. The method as recited in claim 21 wherein said first data comprises data from a particular bank within said cache line, wherein said particular bank stores data which is modified by said store memory access.

25. A microprocessor, comprising:

a load/store configured to select a speculative store memory access for access to a data cache, wherein said load/store unit is configured to transmit said speculative store memory access to said data cache; and a data cache coupled to receive said speculative store memory access, wherein said data cache is configured to read first data from a cache line accessed by said speculative store memory access, and wherein said data cache is further configured to store second data corresponding to said speculative store memory access into said cache line subsequent to reading said first data, and wherein said data cache includes a buffer configured to store said first data;

wherein said load/store unit is configured to receive an indication that said speculatively store memory access is incorrectly executed, and wherein said load/store unit is configured to convey said speculative store memory access to said data cache in response to said indication, and wherein said data cache is configured to store said first data into said cache line from said buffer in response to said indication, whereby said first data is restored to said cache line.

26. The microprocessor as recited in claim 25 wherein said data cache is set associative, and wherein said buffer is further configured to store a value indicative of a column within said data cache corresponding to said cache line.

27. The microprocessor as recited in claim 26 wherein said data cache is configured to receive said value and to store said first data into said column of said data cache.

28. The microprocessor as recited in claim 25 wherein said microprocessor is configured to assert said indication in response to detection of a mispredicted branch instruction.

29. The microprocessor as recited in claim 28 wherein said load/store unit is further configured to halt further speculative store execution in response to detection of said mispredicted branch instruction.

30. The microprocessor as recited in claim 29 wherein said microprocessor is configured to indicate, via a third indication, to said load/store unit that said mispredicted branch instruction is retiring.

31. The microprocessor as recited in claim 30 wherein said load/store unit and said data cache are configured to restore said first data upon assertion of said third indication.

32. The microprocessor as recited in claim 25 wherein said microprocessor is configured to assert said indication in response to an exception-causing instruction.

33. The microprocessor as recited in claim 32 wherein said load/store unit and said data cache are configured to restore said first data upon assertion of said indication.

34. The microprocessor as recited in claim 25 wherein said load/store unit is configured to concurrently select a plurality of said speculative store memory accesses for cache access, and wherein said load/store unit includes a pointer indicative of a most recently performed one of said plurality of speculative store memory accesses.

35. The microprocessor as recited in claim 34 wherein said load/store unit and said data cache are further configured to restore first data corresponding to said most recently performed one of said plurality of memory accesses in response to said indication.

36. The microprocessor us recited in claim 35 when said load/store unit is further configured to update said pointer to indicate a next most recently performed one of said plurality of speculative store memory accesses, and wherein said load/store unit and said data cache are further configured to restore first data corresponding to said next most recently performed one of said plurality of memory accesses.

37. The apparatus as recited in claim 25 wherein said data cache is configured into a plurality of banks, and wherein said first data comprises data stored in one of said plurality of banks, wherein said one of said plurality of banks includes data modified by said speculative store memory access.

38. A computer system comprising:

a microprocessor, comprising:

a load/store unit configured to select a speculative store memory access for access to a data cache, wherein said load/store unit is configured to transmit said speculative store memory access to said data cache; and a data cache coupled to receive said speculative store memory access, wherein said data cache is configured to read first data from a cache line accessed by said speculative store memory access, and wherein said data cache is further configured to store second data corresponding to said speculative store memory access into said cache line subsequent to reading said first data, and wherein said data cache includes a buffer configured to store said first data;

wherein said load/store unit is configured to receive an indication that said speculatively store memory access is incorrectly executed, and wherein said load/store unit is configured to convey said speculative store memory access to said data cache in response to said indication, and wherein said data cache is configured to store said first data into said cache line from said buffer in response to said indication, whereby said first data is restored to said cache line; and an input/output (I/O) device coupled to said microprocessor, wherein said I/O device is configured to communicate between said computer system and another computer system to which said I/O device is coupled.

39. The computer system as recited in claim 38 further comprising a second microprocessor coupled in parallel with said microprocessor.

40. The computer system as recited in claim 38 wherein said I/O device comprises a modem.

* * * * *

UNITED STATES PATENT AND TRADEMARK OFFICE
CERTIFICATE OF CORRECTION

PATENT NO.   : 5,838,943
DATED        : November 17, 1998
INVENTOR(S)  : Hebbalalu Suryaprakash Ramagopal, et al It is certified that error appears in the above-identified patent and that said Letters Patent is hereby corrected as shown below:

In the Claims:

Claim 25, col. 26, line 17, please insert --unit-- after "load/store".

Signed and Sealed this

Thirtieth Day of March, 1999

Attest:

Q. TODD DICKINSON

*Attesting Officer*     *Acting Commissioner of Patents and Trademarks*